US008792682B2

(12) United States Patent
Fan et al.

(10) Patent No.: US 8,792,682 B2
(45) Date of Patent: Jul. 29, 2014

(54) METHOD AND SYSTEM FOR IDENTIFYING A LICENSE PLATE

(75) Inventors: Zhigang Fan, Webster, NY (US); Vladimir Kozitsky, Rochester, NY (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 178 days.

(21) Appl. No.: 13/091,371

(22) Filed: Apr. 21, 2011

(65) Prior Publication Data

US 2012/0269398 A1 Oct. 25, 2012

(51) Int. Cl.
*G06K 9/00* (2006.01)

(52) U.S. Cl.
USPC ............ 382/105; 382/100; 382/148; 382/154

(58) Field of Classification Search
USPC .................................. 382/105, 100, 148, 154
See application file for complete search history.

(56) References Cited

U.S. PATENT DOCUMENTS

| 4,817,166 | A | 3/1989 | Gonzalez et al. | 382/1 |
|---|---|---|---|---|
| 5,187,753 | A | 2/1993 | Bloomberg et al. | 382/46 |
| 5,495,538 | A * | 2/1996 | Fan | 382/233 |
| 6,178,263 | B1 * | 1/2001 | Fan et al. | 382/198 |
| 6,553,131 | B1 | 4/2003 | Neubauer et al. | 382/105 |
| 6,574,375 | B1 * | 6/2003 | Cullen et al. | 382/290 |
| 6,973,213 | B2 | 12/2005 | Fan et al. | 382/176 |
| 6,980,698 | B2 | 12/2005 | Eschbach et al. | 382/278 |
| 6,982,654 | B2 | 1/2006 | Rau et al. | 340/937 |
| 7,376,272 | B2 | 5/2008 | Fan et al. | 382/173 |
| 2003/0174892 | A1 * | 9/2003 | Gao et al. | 382/225 |
| 2005/0185841 | A1 * | 8/2005 | Tyan et al. | 382/181 |
| 2005/0238229 | A1 * | 10/2005 | Ishidera | 382/165 |
| 2008/0031522 | A1 | 2/2008 | Axemo et al. | 382/181 |
| 2008/0055669 | A1 * | 3/2008 | Nagarajan et al. | 358/462 |
| 2008/0131001 | A1 * | 6/2008 | Hofman et al. | 382/182 |
| 2010/0054539 | A1 | 3/2010 | Challa | 382/105 |

OTHER PUBLICATIONS

Lowe, David G., Object Recognition from Local ScaleInvariant Features, Proc.Of the International Conference on Computer Vision, Corfu (Sep. 1999)
Anagnostopoulous, C-N E., Anagnostopoulos, I. E., Psoroulas,I. D., Loumos, V., Kayafas, E; License Plate Recognition From Stil Images and Video Sequences: A Survey IEEE Transactions on Intelligent Transportation Systems, vol. 9, No. 3, Sep. 2008.

* cited by examiner

*Primary Examiner* — Tom Y Lu
*Assistant Examiner* — Weiwen Yang
(74) *Attorney, Agent, or Firm* — Kermit D. Lopez; Luis M. Ortiz; William B. Shelby (57) ABSTRACT

A license plate localization method and system based on a combination of a top-down texture analysis and a bottom-up connected component. An image with respect to a vehicle captured by an image capturing unit can be processed in order to locate and binarize a busy area. A black run with respect to the binarized image can be analyzed and classified and one or more objects (connected components) can be generated based on the black run classification. The objects can be further classified in accordance with their size utilizing a run-length based filter to filter out a non-text object. The leftover objects can then be spatially clustered and the uniformity and linearity of the clustered objects can be examined based on a linearity test. The clustered objects can be rejected if they fail the linearity test and the detected objects can further be matched with a plate edge characteristic in order to locate a license plate.

16 Claims, 6 Drawing Sheets

METHOD AND SYSTEM FOR IDENTIFYING A LICENSE PLATE

TECHNICAL FIELD

Embodiments are generally related to ALPR (Automatic License Plate Recognition) systems and methods. Embodiments are also related to image processing systems and methods. Embodiments are additionally related to the localization of a license plate.

BACKGROUND OF THE INVENTION

ALPR often functions as the core module of "intelligent" transportation infrastructure applications. License plate recognition can be employed to identify a vehicle by automatically reading a license plate utilizing image processing and character recognition technology. A license plate recognition operation can be performed by locating the license plate in an image, segmenting the characters in the plate, and performing an OCR (Optical Character Recognition) operation with respect to the characters identified.

License plate localization can be employed to accurately and efficiently locate a license plate from an image of the vehicle. Most prior art approaches for locating a license plate involve the detection of a region whose features match the license plate. Such features may include shape (e.g., rectangle), texture containing strong edges from the text and the plate boundary, and color (if the color of the plate is known). Since there are problems such as poor image quality due to ambient lighting conditions, image perspective distortion, interference characters, etc., such prior art approaches are unable to accurately locate the license plate.

Based on the foregoing, it is believed that a need exists for an improved license plate localization method and system based on a combination of a top-down texture analysis and a bottom-up connected component analysis, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved automatic license plate recognition methods and systems.

It is another aspect of the disclosed embodiments to provide for an improved method and system for accurately locating a license plate.

It is yet another aspect of the disclosed embodiments to provide for improved methods and systems for license plate recognition based on texture analysis.

It is still another aspect of the disclosed embodiments to provide for improved methods and systems for license plate recognition based on connected component analysis.

It is yet another aspect of the disclosed embodiments to provide for improved methods and systems for license plate recognition based on texture analysis.

It is also another aspect of the disclosed embodiments to provide for improved methods and systems for license plate recognition based on texture analysis and/or connected component analysis.

The aforementioned aspects and other objectives and advantages can now be achieved as described herein. A license plate localization method and system based on a top-down texture analysis and/or a bottom-up connected component analysis is disclosed herein. An image with respect to a vehicle captured by an image capturing unit can be processed in order to locate and binarize a busy area. A black run with respect to the binarized image can be analyzed and classified and one or more objects (connected components) can be generated based on a black run classification. The objects can be further classified in accordance with their sizes utilizing a run-length based filter to filter out non-text objects. The leftover objects can be then spatially clustered and the uniformity and linearity of the clustered objects examined based on a linearity test. The clustered objects can be rejected if they fail the linearity test. The detected objects can be further matched with one or more plate edge characteristics in order to locate a license plate.

The top down texture analysis identifies a potential area (e.g., runs) for further investigation and the bottom up connected component analysis completes the license plate identification. The input images can be high-pass filtered before binarization in order to adapt to different background colors (e.g., gray levels). A "run" can be defined as a set of one-dimensionally (e.g., horizontally) connected pixels of similar color. The runs that are unlikely to be a part of the text objects can be screened by the run-length based filter in order to reduce false alarms and computational effort.

The black runs of the binarized image can be initially classified into at least three categories such as, for example, tiny, short, median, and long based on the length by a run classification unit. Two thresholds which correspond to a maximum vertical stroke width and a maximum run-length can be set. A run can be classified as tiny if the length is smaller than the maximum vertical stroke width and as small if the length is between the maximum vertical stroke width and maximum run-length. A third threshold separates rest of the runs into median and long runs. The median and long runs that are not a part of the text can be deleted in order to reduce text-frame touching. The run that is initially classified as tiny or short can be reclassified as long it is neighboring, that is if the run is adjacent to the long run. The long neighboring runs can also be discarded and the connected components creation can be performed by first identifying the tiny run as a start point. The object then grows recursively by adding tiny and/or small runs that touches the object in order to insure that the object contains at least one tiny run and it is composed entirely by tiny and small runs.

Once a cluster is detected, an area slightly larger than a bounding box of the cluster can be cropped from the original image (not the binarized one) and a dominant orientation can be estimated for the area. If the plate does not have visible boundaries, the orientation can be determined by a top and bottom line formed by the text. If the plate boundaries exist, the orientation is often dominant by the plate boundaries as they are typically longer. The objects in the cluster can be projected to the direction detected in order to determine whether the top pixels and bottom pixels form two lines. A fitting error can be calculated as the result of the linearity test. The detected license plate can be then transmitted to other modules (e.g., character segmentation, Optical character recognition, and/or plate matching) and the feedback (e.g. character segmentation and OCR results) from the modules can be received in order to alter the decision of the license plate detection.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a visually oriented programming environment, such as, for example, VisualBasic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
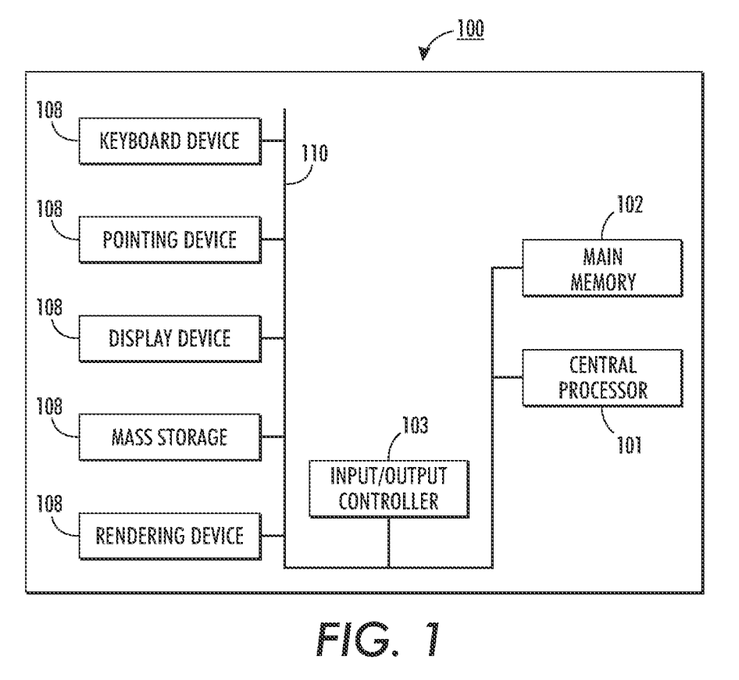
FIG. 1 illustrates a schematic view of a computer system, in accordance with the disclosed embodiments.
Figure 2:
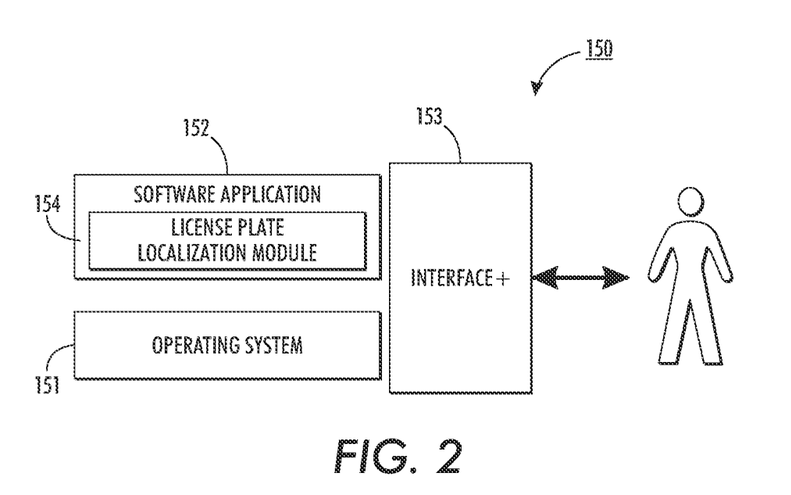
FIG. 2 illustrates a schematic view of a software system including a license plate localization module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device, such as a mouse, track ball, and pen device, etc.), a display device 106, a mass storage 107 (e.g., a hard disk), and a USB (Universal Serial Bus) peripheral connection 111. Additional input/output devices, such as an image capturing unit 108 (e.g., camera, etc.), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 152, stored in main memory 102 and on mass storage 107, generally includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 154 and/or software application 152.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are potential. For example, rather than a traditional "Windows" system, other operation systems, such as, for example, Linux may also be employed with respect to operating system 151 and interface 152. The software application 152 can include a license plate localization module 154 for locating a license plate based on a combination of a top-down texture analysis and a bottom-up connected component analysis. Software application 152, on the other hand, can include instructions, such as the various operations described herein with respect to the various components and modules described herein, such as, for example, the method 500 depicted in FIG. 5.

FIGS. 1-2 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 3:
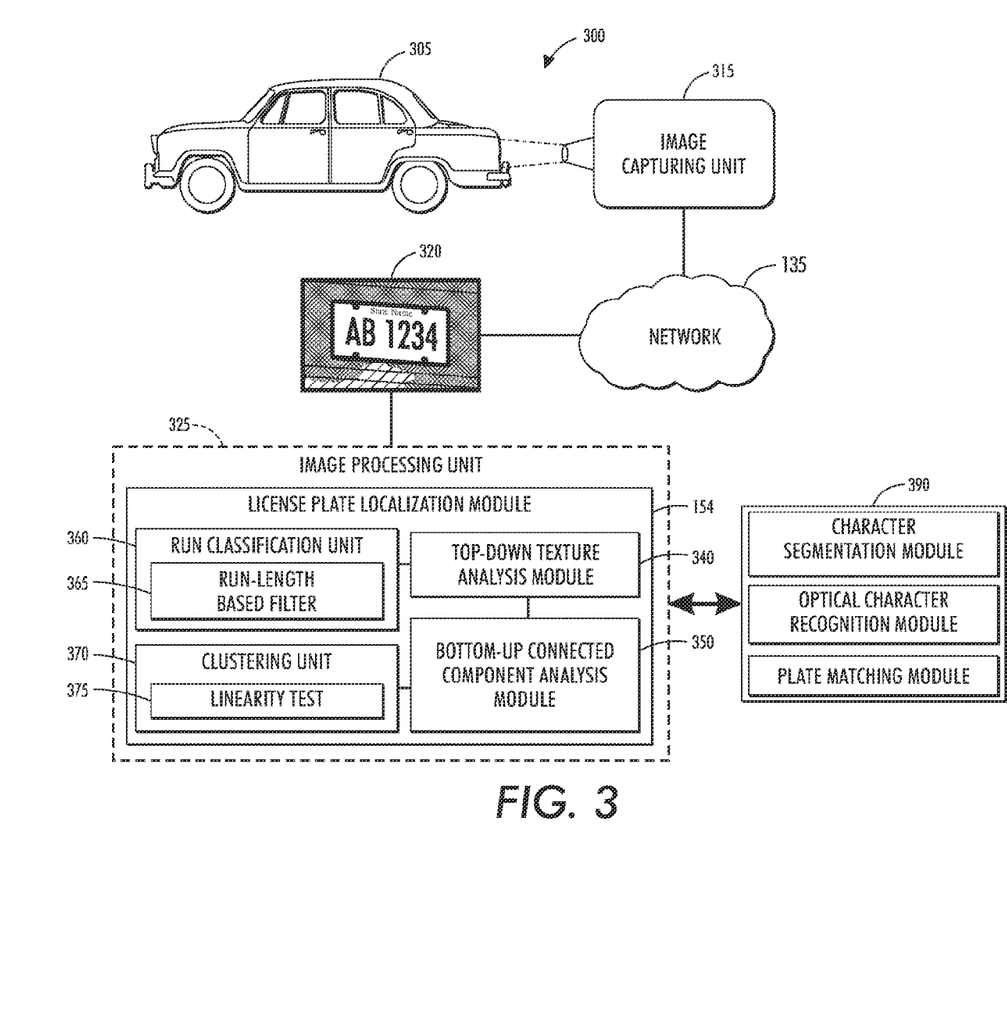
FIG. 3 illustrates a block diagram of a license plate localization system, in accordance with the disclosed embodiments.
Figure 4:
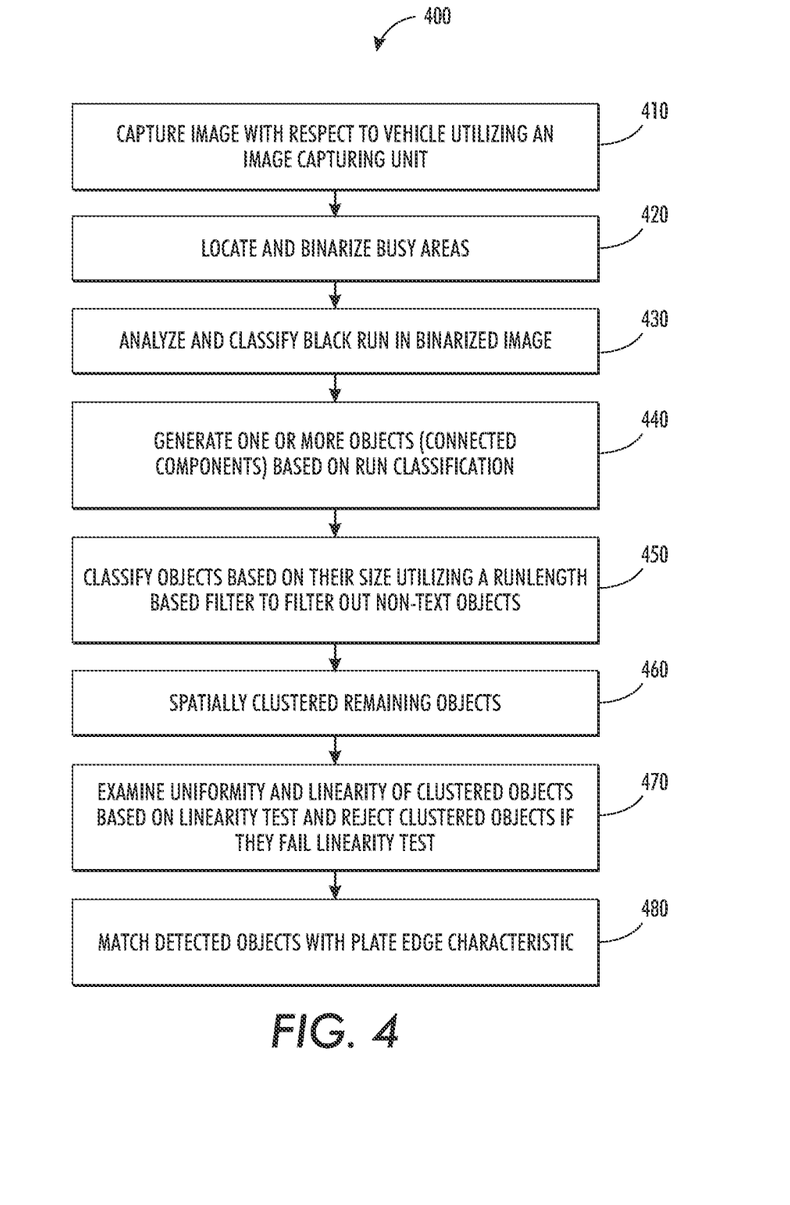
FIG. 4 illustrates a high level flow chart of operation illustrating logical operation steps of a method for locating a license plate based on a combination of a top-down texture analysis and a bottom-up connected component analysis, in accordance with the disclosed embodiments.

FIG. 3 illustrates a block diagram of a license plate localization system 300, in accordance with the disclosed embodiments. Note that in FIGS. 1-8, identical or similar blocks are generally indicated by identical reference numerals. The license plate localization system 300 generally includes an image capturing unit 315 (e.g., camera) for capturing an image of a vehicle 305 within an effective field of view. The image capturing unit 315 provides an image 320 of a license plate mounted on the rear of the vehicle 305. Note that the license plate localization system 300 is capable of reading the license plate on the front of the vehicle 305 as well as the rear. The image capturing unit 315 can be operatively connected to an image processing unit 325 via a network 330.

Note that the network 330 may employ any network topology, transmission medium, or network protocol. The network 330 may include connections, such as wire, wireless communication links, or fiber optic cables. Network 330 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The image capturing unit 315 can be operated as a hand-held device and/or a vehicle-mounted device. Note that the image capturing unit 315 described in greater detail herein are analogous or similar to the image capturing unit 108 of the data-processing system 100, depicted in FIG. 1. The image capturing unit 315 may include built-in integrated functions such as image processing, data formatting and data compression functions. Also, the unit includes imager-positioning, range-finding and a flash bulb.

The image processing unit 325 receives the captured digital image 320 from the image capturing unit 315 in order to process the image 320. The image processing unit 325 is preferably a small, handheld computer device or palmtop computer as depicted in FIG. 1 that provides portability and is adapted for easy mounting. The image processing unit 325 can be configured to include the license plate localization module 154 to accurately locate the license plate of the vehicle 305. The license plate localization module 154 further includes a top-down texture analysis module 340, a bottom-up connected component analysis module 350, a run classification unit 360 and a clustering unit 370. It can be appreciated that the run classification unit 360 and the clustering unit 370 can be implemented as software modules.

The license plate localization module 154 process the image 320 in order to locate and binarize a busy area. In general, image binarization converts an image of up to 256 gray levels to a black and white image. A threshold value can be chosen and all pixels can be classified with values above this threshold as white, and all other pixels as black. For example, the input image 320 can be divided into disjoint blocks and each block can be tested to check if the dynamic range exceeds the threshold. The high dynamic range blocks can be considered to be busy and are binarized by thresholding. The input images are usually high-pass filtered before binarization to adapt to different background colors (gray levels).

The run classification unit 360 analyze and classifies a black run with respect to the binarized image and generate one or more objects (connected components) based on the run classification. Note that a run is defined a set of one-dimensionally (horizontally) connected pixels of similar color. An "object" is a collection of related pixels, wherein the pixels are connected or otherwise associated with one another within a connected boundary or border. An object may be a character a word or a text, a contone image or a combination or collection thereof. The run classification unit 360 further classifies the objects in accordance with their size utilizing a run-length based filter 365 to filter out a non-text object. The run classification unit 360 considers the objects that are too small and too large as non-text and delete the objects. The remaining objects can be clustered to form lines via a recursive procedure. The clustering unit 370 spatially clusters the leftover objects and examine the uniformity and linearity of the clustered objects based on a linearity test 375.

The clustered objects can be rejected if they fail the linearity test 375 and the detected objects can further be matched with a plate edge characteristic in order to locate the license plate. The detected plate images can be transmitted to other modules such as for example, a character segmentation/OCR/plate matching module 390. The feedback from the modules 390 can be received in order to alter the decision of the license plate detection. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

Figure 6:
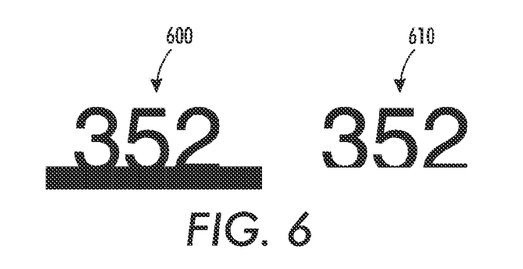
FIGS. 6-8 illustrate pictorial views of an input image and a processed image for locating the license plate, in accordance with the disclosed embodiments.

FIG. 6 illustrates a high level flow chart of operations illustrating logical operational steps of a method 400 for dynamically allocating resources between departments in a process, in accordance with the disclosed embodiments. It can be appreciated that the logical operational steps shown in FIG. 6 can be implemented or provided via, for example, a module such as module 152 shown in FIG. 2 and can be processed via a processor, such as, for example, the processor 101 shown in FIG. 1. As indicated at block 410, the image 320 with respect to the vehicle 305 can be captured by the image capturing unit 315. Thereafter, as illustrated at block 420, a busy area can be located and binarized. Next, as indicated at block 430, a black run with respect to the binarized image can be analyzed and classified. Following processing of the operation depicted at block 430 one or more objects (connected components) can be generated based on the run classification, as shown at block 440.

Figure 5:
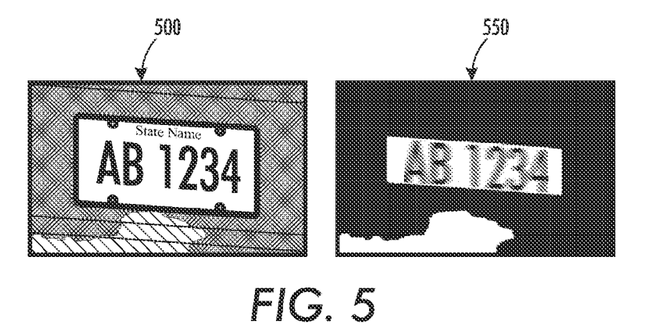
FIG. 5 illustrates pictorial views of an input image and a binarized image, in accordance with the disclosed embodiments.

The method 400 can be based on the observations that the text symbols in the license plate differ from the text in a document in the following aspects. For example, plates can be mounted with frames (often in dark color) and the widths of the frames may vary. The frame may touch the text and even cover a small portion of the text in the plate (often at the top or at the bottom). FIG. 5 illustrate pictorial views of an input image 500 and a binarized image 550, in accordance with the disclosed embodiments. The image 500 illustrated in FIG. 5 is the input image that is cropped to represent the plate and the image 550 illustrate a thresholding result of the image 500. The edges can often be observed at the plate boundary and they can be a part of the plate design caused by the plate frame as indicated in FIG. 5, or due to color difference between the plate and the vehicle body.

The plates may employ fixed-pitch fonts, while variable-pitch fonts can be widely adopted in the documents. Text symbols in each individual plate have similar height and the topmost and bottommost pixels for each letter form two lines. In comparison, the text in most documents may include both upper case and lower case letters and their top-line and bottom-line alignments are far from perfect due to ascenders and descenders. For most license plate detection applications (e.g. tolling, red light detection, speeding detection), the images can be typically taken from a camera in a fixed configuration. Although different states have different plate designs and even within a state there are many variations, many geometry parameters employed in the plate alter change only in a rather narrow range. These parameters include text height and width, text pitch, text stroke width, and plate dimension. Based on the observations the method 500 detects text that constitutes the main body of the plates, not the auxiliary ones such as state information, small characters in the stickers, etc.

Figure 7:
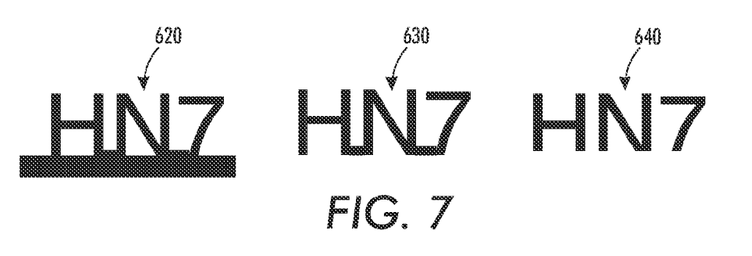
Figure 8:
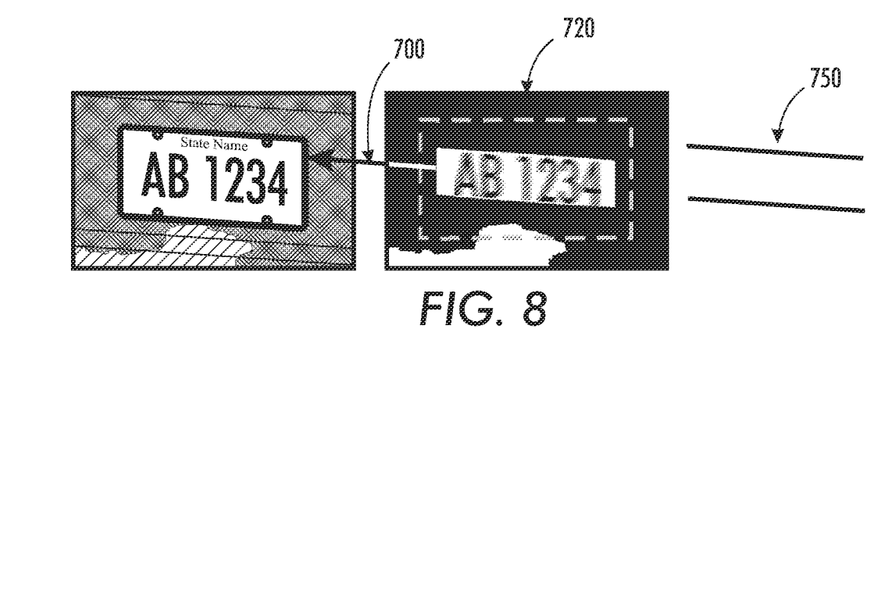

Next, as indicated at block 450, the objects can be further classified in accordance with their size utilizing the run-length based filter 365 to filter out a non-text object. FIGS. 6-8 illustrate pictorial views of an input image and a processed image for locating the license plate, in accordance with the disclosed embodiments. The top down texture analysis module 340 identifies a potential area (runs) for further investigation and the bottom up connected component analysis module 350 completes the license plate identification. The input images can be high-pass filtered before binarization in order to adapt to different background colors (gray levels). The runs that are unlikely to be a part of the text objects can be screened by the run-length based filter 365 in order to reduce reducing false alarm and computation. The text from can be separated from the frame if the text touches the frame.

The black runs of the binarized images can be initially classified into at least three categories such as, for example, tiny, short, median, and long based on the length by the run classification unit 360. Two thresholds Tt and Ts which correspond to a maximum vertical stroke width and a maximum run-length can be set. A run can be classified as tiny if the length is smaller than Tt and as small if the length is between Tt and Ts. A character object includes only tiny and short runs and at least one tiny run (as the character contains at least one vertical stroke). A third threshold Tm, separates rest of the runs into median and long. The median and long runs that are not a part of the text can be deleted to reduce an opportunity of the text-frame touching.

The deletion of long runs certainly reduces the opportunity of text-frame touching, as illustrated in FIG. 6. FIG. 6 illustrates a pictorial view of an original image 600 and an image 610 detected after the long run deletion. FIG. 7 illustrates a pictorial view of another image 620 and an image 630 after long run deletion. The characters in the image 630 depicted in FIG. 7 still touch even after removing the long runs. The run that is initially classified as tiny or short can be reclassified as long neighboring if the run is adjacent to the long run. The long neighboring runs can also be discarded and the connected components creation can be performed by first identifying a tiny run as a start point. The object then grows recursively by adding tiny or small runs that touches the object in order to insure that the object contains at least one tiny run and it is composed entirely by tiny and small runs. FIG. 7 illustrates an image 640 after long neighboring runs are deleted. The run-length based filter 365 screen out non-text objects as there are only small changes in text dimensions and plate dimensions if the images are taken from the same image processing unit 315.

Thereafter, the leftover objects can then be spatially clustered and the uniformity and linearity of the clustered objects can be examined based on the linearity test 375, as illustrated at blocks 460 and 470. The clustering unit 370 cluster two objects into a similar group if a vertical position difference is smaller than Tv, and a horizontal distance smaller than Th, where Th and Tv are two preset thresholds. The clustering unit 370 discards a cluster with too few or too many objects. The clustering unit 370 examines the uniformity and linearity for each remaining cluster and determines if the topmost pixels and bottommost pixels of the objects in the cluster form two roughly parallel lines and whether the lines are consistent with the overall direction of the surrounding and if the objects in the cluster have similar colors.

Once a cluster is detected, an area slightly larger than a bounding box of the cluster can be cropped 8 from the original image (not the binarized one) as indicated by gray dashed lines 720 in FIG. 8. Thereafter, the dominant orientation can be estimated for the area as indicated by an arrow 700. If the plate does not have visible boundaries, a orientation can be determined by a top and bottom line 750 formed by the text. If the plate boundaries exist, the orientation is often dominant by the plate boundaries, as they are typically longer. Note that the orientation can be estimated by, for example, a technique, such as a Hough transform or another appropriate approach, depending upon design considerations. As in most cases the license plate does not have a significant skew, the orientation can be searched utilizing other transformations.

The objects in the cluster can be projected to the direction detected in order to check whether the top pixels and bottom pixels form two lines. A fitting error can be calculated as the result of the linearity test 375. Finally, as described at block 480, the clustered objects can be rejected if they fail the linearity test 375 and the detected objects can further be matched with a plate edge characteristic in order to locate the license plate. The linearity test 375 can be designed to determine if the detected text objects forming lines and if the lines are consistent with the plate edges as the text symbols may touch the frame and become a part of a much larger connected component.

It will be appreciated that variations of the above-disclosed and other features and functions, or alternatives thereof, may be desirably combined into many different systems or applications. Also that various presently unforeseen or unanticipated alternatives, modifications, variations or improvements therein may be subsequently made by those skilled in the art which are also intended to be encompassed by the following claims.

What is claimed is:

1. A method for locating a license plate, said method comprising:
    analyzing an image of a vehicle utilizing a top-down analysis method to identify a potential license plate area of a license plate by producing a binarized image of said image of said vehicle;
    locating and binarizing a busy area of said image of said vehicle and thereafter classifying a black run with respect to a binarized image and generating a plurality of objects based on a black run classification;
    classifying said black run of said binarized image into at least three categories based on length by a run classification unit;
    utilizing a run-length based filter to filter out non-text objects by retaining at least two smallest categories of said at least three categories of said black run in order to thereafter spatially cluster at least one leftover object;
    analyzing said at least one leftover object utilizing a bottom-up analysis method by examining a uniformity and a linearity of a clustered object of said at least one leftover object based on a linearity test in order to thereafter match a detected object with a plate edge characteristic in order to locate a license plate; and
    generating a license plate identification of said license plate.

2. The method of claim 1 further comprising rejecting said clustered object if said clustered object fails said linearity test.

3. The method of claim 1 further comprising high-pass filtering said image of said vehicle prior to a binarization of said image of said vehicle in order to adapt to a plurality of background colors for use in locating and identifying said license plate.

4. The method of claim 1 wherein said black run comprises at least one of the following types of runs: a tiny run; a short run; a median run; and a long run.

5. The method of claim 1 wherein said run-length based filter further comprises:
    setting at least two thresholds that correspond to a maximum vertical stroke width and a maximum run-length;
    classifying a run as a tiny run if said length is smaller than said maximum vertical stroke width and as a short run if said length is between said maximum vertical stroke width and said maximum run-length; and
    setting a third threshold to separate remaining runs into a median run and a long run in order to thereafter delete said median run and said long run that are not a part of a text to reduce an opportunity of a text-frame touching.

6. The method of claim 1 wherein said run-length based filter further comprises:
    re-classifying a run that is initially classified as a tiny run or a short run if said run is adjacent to a long run; and
    discarding long neighboring runs and performing a connected component creation by identifying said tiny run as a start point wherein said plurality of objects grow recursively by adding said tiny run and said short run that touches said plurality of objects.

7. The method of claim 1 wherein said linearity test further comprises:
    cropping an area slightly larger than a bounding box of a said cluster from an image of a vehicle if said cluster is detected in order to estimate a dominant orientation for said area slightly larger than a bounding box;
    determining an orientation of a top and bottom line formed by a text if said license plate does not have a visible boundary in order to thereafter project said clustered object to a direction detected to determine whether a top pixel and a bottom pixel form at least two lines; and
    calculating a fitting error as a result of said linearity test.

8. The method of claim 1 further comprising transmitting said identified license plate to a module in order to thereafter receive feedback from said module to alter a detection decision.

9. The method of claim 8 further comprising at least one of the following types of module: a character segmentation module; an optical character recognition module; and/or a license plate matching module.

10. A system for locating a license plate, said system comprising:
- a processor;
- a data bus coupled to said processor;
- a computer-usable medium embodying computer code, said computer-usable medium being coupled to said data bus, said computer program code comprising instructions executable by said processor and configured for:
- analyzing an image of a vehicle utilizing a top-down analysis method to identify a potential license plate area of a license plate by producing a binarized image of said image of said vehicle;
- locating and binarizing a busy area of said image of said vehicle and thereafter classifying a black run with respect to a binarized image and generating a plurality of objects based on a black run classification;
- classifying said black run of said binarized image into at least three categories based on length by a run classification unit;
- utilizing a run-length based filter to filter out non-text objects by retaining at least two smallest of said at least three categories of said black run in order to thereafter spatially cluster at least one leftover object;
- analyzing said at least one leftover object utilizing a bottom-up analysis method by examining a uniformity and a linearity of a clustered object of said at least one leftover object based on a linearity test in order to thereafter match a detected object with a plate edge characteristic in order to locate a license plate; and
- generating a license plate identification of said license plate.

11. The system of claim 10 wherein said instructions are further configured for rejecting said clustered object if said clustered object fails said linearity test.

12. The system of claim 10 wherein said instructions are further configured for high-pass filtering said image of said vehicle prior to said binarization of said image of said vehicle in order to adapt to a plurality of background colors for use in locating and identifying said license plate.

13. The system of claim 10 wherein said run-length based filter further comprises:
- setting at least two thresholds that correspond to a maximum vertical stroke width and a maximum run-length;
- classifying a run as a tiny run if said length is smaller than said maximum vertical stroke width and as a short run if said length is between said maximum vertical stroke width and said maximum run-length; and
- setting a third threshold to separate remaining runs into a median run and a long run in order to thereafter delete said median run and said long run that are not a part of a text to reduce an opportunity of a text-frame touching.

14. The system of claim 10 wherein said run-length based filter further comprises:
- re-classifying a run that is initially classified as a tiny run or a short run if said run is adjacent to a long run; and
- discarding long neighboring runs and performing a connected component creation by identifying said tiny run as a start point wherein said plurality of objects grow recursively by adding said tiny run or said short run that touches said plurality of objects.

15. The system of claim 10 wherein said linearity test further comprises:
- cropping an area slightly larger than a bounding box of a cluster from said image of said vehicle if said cluster is detected in order to estimate a dominant orientation for said area slightly larger than a bounding box;
- determining an orientation of a top and bottom line formed by a text if said license plate does not have a visible boundary in order to thereafter project said object in said cluster to a direction detected to determine whether a top pixel and a bottom pixel form at least two lines; and
- calculating a fitting error as a result of said linearity test.

16. A processor-readable non-transitory storage medium storing code representing instructions to cause a processor to perform a process to locate a license plate, said code comprising code to:
- analyze an image of a vehicle utilizing a top-down analysis method to identify a potential license plate area of a license plate by producing a binarized image of said image of said vehicle;
- locate and binarize a busy area of said image of said vehicle and thereafter classify a black run with respect to a binarized image and generate a plurality of objects based on a black run classification;
- classify said black run of said binarized image into at least three categories based on length by a run classification unit;
- utilize a run-length based filter to filter out non-text objects by retaining at least two smallest of said at least three categories of said black run in order to thereafter spatially cluster at least one leftover object;
- analyze said at least one leftover object utilizing a bottom-up analysis method by examining a uniformity and a linearity of a clustered object of said at least one leftover object based on a linearity test in order to thereafter match a detected object with a plate edge characteristic in order to locate a license plate; and
- generate a license plate identification of said license plate.

* * * * *